Nov. 26, 1957 — F. A. E. PORSCHE ET AL — 2,814,524
SELF-SUPPORTING BODIES OF SYNTHETIC
MATERIAL FOR MOTOR VEHICLES
Filed April 1, 1954

INVENTORS
Ferdinand A. E. Porsche
Erwin Komenda
BY
ATTORNEYS

Nov. 26, 1957  F. A. E. PORSCHE ET AL  2,814,524
SELF-SUPPORTING BODIES OF SYNTHETIC
MATERIAL FOR MOTOR VEHICLES
Filed April 1, 1954  2 Sheets-Sheet 2
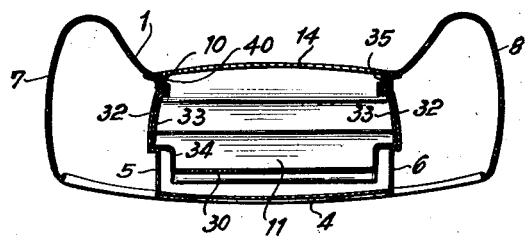
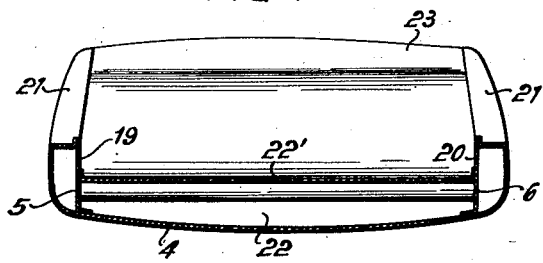
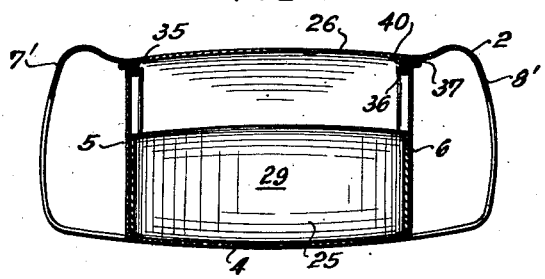
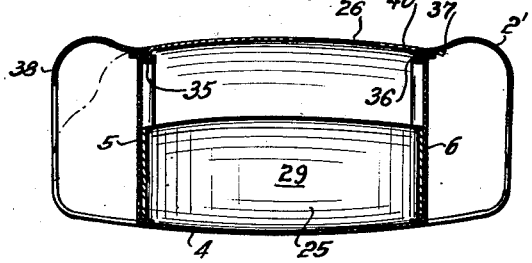
INVENTORS
Ferdinand A.E. Porsche
Erwin Komenda
BY
ATTORNEYS 2,814,524

SELF-SUPPORTING BODIES OF SYNTHETIC MATERIAL FOR MOTOR VEHICLES

Ferdinand A. E. Porsche and Erwin Komenda, Stuttgart, Germany, assignors to Dr. Ing. h. c. F. Porsche K.-G., Stuttgart-Zuffenhausen, Germany Application April 1, 1954, Serial No. 422,863

Claims priority, application Germany April 22, 1953

13 Claims. (Cl. 296—31)

This invention relates to improvements in body structures for automotive vehicles and more particularly to self-supporting bodies made of synthetic material.

Various constructional forms of self-supporting car bodies made from synthetic material are known. All these known constructions necessarily include a multiplicity of separate parts which are provided with corresponding reinforcing edges and the like in order to obtain a rigid supporting framework. Naturally, such a mode of manufacture is very costly, since in some if not all cases nearly as many complicated pressing tools are required as there are individual parts to the body, the first cost of which can be justified only in case of corresponding mass production.

For the purpose of reducing the manufacturing costs it has already been proposed to use smooth-surfaced mouldings to which the reinforcements are subsequently attached in the form of sheet metal stampings and the like. One disadvantage of such a method is the cost of construction involved. Furthermore, careful supervision of the various materials employed with the synthetic resin mass used is required. In order to reduce the number of differently shaped separate parts and to save the provision of a separate supporting frame it has also been proposed to make the car body double-walled and to pack the space between the walls with hardening filling materials. Since in this construction, in order to satisfy strength requirements, thick walls are necessary, the weight of the car becomes too great and the usefulness of the car will consequently be reduced. Furthermore, the connections between the outer and inner walls involve many difficulties and they cannot be effected without costly special arrangements.

According to the invention the foregoing difficulties are overcome by providing side walls which extend throughout the length of the car body from the front to the rear closing wall, and which are connected by means of box-like transverse stiffeners extending substantially perpendicularly from the bottom of the body to its outer skin. By this means there is obtained with only a few simply formed constructional parts a rigid supporting body frame which is composed of moulded parts of large surface, resulting in a considerable saving in the cost of and the equipment used in production. In this arrangement the side walls are drawn or curved inwards at the forward and rearward ends of the car body with respect to the middle part of the car body and are provided with supporting means for the housing of the wheels of both axles, whilst the middle section of the side walls forms the inner part of the frame for the doors. Owing to the circumstance that the side walls extend throughout the entire length of the car body and are made in one piece, the stresses are distributed over a large surface, and the usual reinforcements may be omitted. For this purpose the side walls consist of highly-webbed U-sections which are connected with one another by the bottom wall of the car body. They may, however, alternatively be made in one piece with the bottom, resulting in a trough-shaped structure, to which the remaining individual parts are fixed.

A further considerable simplification is achieved by constructing the transverse stiffening member, which connects the side walls and extends over the entire width of the car, as a seating frame. Through this arrangement additional parts may be saved, in consequence of which the total weight of the car becomes extremely low. The seat frame will then comprise the car bottom, a transverse angle piece and a transverse section piece which together with the other parts forms a hollow girder, the said section piece acting as a transverse wall which shuts off the middle part of the car body from the engine or luggage space. It is possible to make the seating frame and the transverse wall from one piece of sheet material and have it act as a supporting constructional part of the structure of the car body.

A saving of separate parts is also obtained by forming the bottom of the luggage space of a single pressed part of trough-like shape. This bottom will then extend from the front closing wall to the middle part of the car body, at the same time contain or provide the instrument panel and be inserted between the side walls, where it is held by a trough-like depression or channel. Furthermore, the outer body wall casing parts containing the openings for the luggage or engine space are made jointless. The joints around the rims of the openings are formed by a special section bar which surrounds the openings and is preferably of Z-shaped section and on one limb or inwardly projecting flange of which the covers rest, whilst the other limb or flange is connected with the part of the casing around the rim of the openings.

The improved automotive vehicle body of the present invention may be made of pressed and shaped sheet synthetic materials such as various known types of resins which may be reinforced with suitable reinforcing materials such as glass fibers.

In the accompanying drawings which form a part of this application and which illustrate diagrammatically a constructional example of the invention, Fig. 1 is a vertical central longitudinal sectional view through the body of a sports car with rear engine drive, illustrating one constructional form according to the invention;

Fig. 2 in its upper part is a horizontal section taken on the line II—II of Fig. 1, and in the lower part is a plan view of the sports car shown in Fig. 1;

Fig. 3 is a vertical sectional view taken on the line III—III of Fig. 1;

Fig. 4 is a vertical sectional view taken on the line IV—IV of Fig. 1;

Fig. 5 is a vertical sectional view taken on the line V—V of Fig. 1; and

Fig. 6 is a view similar to that of Fig. 5 through a similar but somewhat modified constructional form of the invention.

Figure 1:
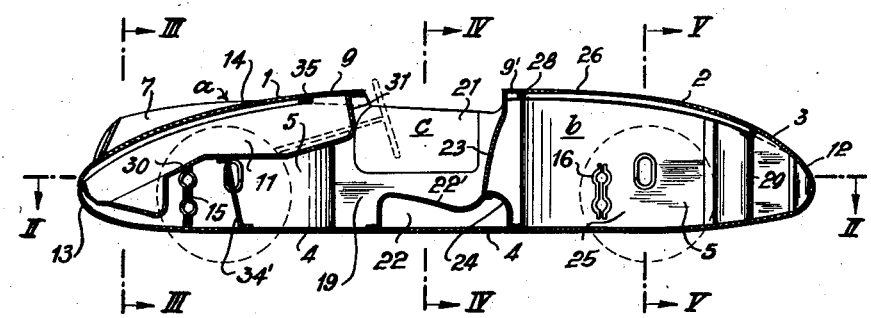

The car body illustrated in and shown more or less diagramamtically in Figs. 1 to 5 of the drawings comprises front, rear and middle parts a, b and c, respectively. The front part of the body comprises a casing or outer body wall 1 of sheet material, while the rear part comprises casing elements 2 and 3 also of sheet material. The car body includes a bottom wall 4 and side walls or panels 5 and 6, all of pressed synthetic sheet material, and connected by a box-like transverse stiffening structure 22. The front casing 1, including its forward lateral portions or outer wheel housings 7 and 8 and the transverse cowl section 9, adjacent to the position of the windshield, comprises a single formed sheet of synthetic material. This sheet is provided with an opening 10 adjacent the transverse section 9, extending between the sections 7 and 8 through which a luggage space 11 is accessible. The opening 10 (Fig. 2) also extends from the cowl part 9 to a front closing wall 13 and is provided with a cover or closure 14.

Figure 2:
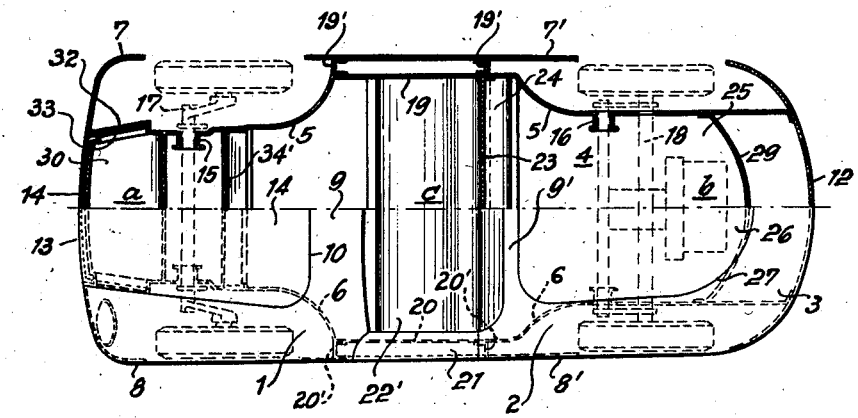

The rear casing 2 of the body, including its side sections or rear wheel housings 7' and 8' and the transverse section 9' directly in back of the seat, constitutes a single unit of shaped sheet synthetic material. The rear casing unit 2 is provided with an opening 27 (Fig. 2) through which the engine space 25 is accessible. The opening 27 is provided with a cover 26 which extends from the transverse section 9' to the rear part 3. The rear part 3 of the body comprises a rear closing wall 12 which is oval-shaped in two directions, as shown in Figs. 1 and 2, the closing wall 12 being fixed to the casing part 2, the side walls 5 and 6 and the bottom wall 4 by joints, not shown, and which are effected in a conventional manner by means of synthetic bonding material.

The side walls 5 and 6, together with the bottom wall 4 and the transverse stiffening and reinforcing structure 22, provide the main supporting parts of the car body to which the units 1, 2 and 3 are fixed by synthetic bonding material, thereby providing a self-supporting car body. The side walls 5 and 6 extend the length of the vehicle body between the forward and rear closing walls 13 and 12 and are formed so as to extend upwardly from the bottom wall 4 to the outer skin or casing units of the body comprising the elements 1, 2 and 3. The walls 5 and 6 are of similar construction and bow inwardly and forwardly at the juncture of the parts c and a, with respect to the side walls along the part c of the body, as shown in Fig. 2, to form the inside walls of the front wheel housings. The walls 5 and 6 curve inwardly and rearwardly in a similar manner at the front of the rear part b to form the inner walls of the rear wheel housings, also shown in Fig. 2. The walls 5 and 6 are provided with front and rear supports 15 and 16, respectively, for axle structures 17 and 18 indicated in dotted lines in Fig. 2. The walls 5 and 6 also respectively include middle sections 19 and 20, which form the inner frame parts for doors 21, as shown in Figs. 2 and 4. Vertical U-shaped spacer brackets 19' and 20' are attached between the sections 19 and 20, respectively, and the outer body wall units 1 and 2 in front and back of the doors, as shown in Fig. 2.

The box-like transverse stiffening structure 22 connecting and extending between the side walls 5 and 6 of the body constitutes a seat supporting frame and comprises the bottom wall 4 under the seat, an angle piece 22' and an upwardly extending section 23. The elements 22' and 23 are connected and formed to the shape of the human body so that it is only necessary to cover them with suitable padding to provide the seats, including the cushion and back. The element 23 is preferably shaped in the manner shown in Fig. 1, so that it includes a support 24 and the back of the seat, and at the same time includes a transverse flange under the part 9' which separates the middle part c of the body with respect to the engine space 25. This transverse wall 23 is fixed to the bottom wall 4, the side walls 5 and 6, the section 22' and to the body casing 9'.

While the transverse stiffening structure 22 is illustrated as comprised of two sheets attached together, the part 22 extending from the wall 4 upwardly, then slanting downwardly and curved upwardly again and attached to the element 23 at the top of the section 24, may be made integral with the section 23 forming the back of the seat frame.

At the top of the transverse wall or part 23, the material is preferably bent over and flanged down in the manner shown at 28, Fig. 1, and this U-shaped flanged structure is advantageously carried down the side walls 5 and 6 to the bottom 4.

The side walls 5 and 6 and the bottom wall 4 may be formed in one piece, of synthetic materials, thereby providing further simplification in the building of the body of the vehicle. In either form of construction, it has been found, however, that with such a large constructional unit as that provided by the bottom 4 and walls 5 and 6, it is advantageous to provide, in addition to the transverse stiffening structure 22, a second transverse stiffener comprising a shaped upright wall part 29 and the closing wall 12, the wall 29 being spaced inwardly from the closing wall 12. The upright wall 29 is attached to the walls 4, 5 and 6 and the tail piece 3 and is symmetrically curved so that it is substantially parallel to the curvature line of the wall 12, as shown in Fig. 2.

The luggage compartment 11 in the forward part a of the vehicle is provided with a bottom wall 30, which is made of a single shaped piece of synthetic material extending from the forward closing wall 13 between the side walls 5 and 6 and to the middle part c of the body. The upper end of the wall 30 is attached under the rear portion of the cowling 9 and includes a downwardly extending section 31 forming the instrument panel support. From the section 31 the bottom 30 extends gradually downwardly over the front axle and then abruptly downwardly to a point spaced somewhat from the bottom wall 4 and then forwardly to the front of the body adjacent the closing wall 13. The bottom 30 is attached to or fixed between the side walls 5 and 6 and for this purpose the side walls are at least in part provided with channel or trough shaped pressed out sections 32 (Figs. 2 and 3) into which similarly bent-out sections 33 of side walls 34 of the wall 30 are engaged. A transverse wall or web section 34' is secured to the bottom walls 4 and 30 between the walls 5 and 6 back of the axle 17.

The two casing units or parts 1 and 2, which cover the outside of the body are made seamless and form one piece of material, the covers 14 and 26 being cut out of them after the material has hardened. In this case where the covers are cut from the pieces of sheet material, the covers are rendered tight and supported in place by separate grooved bars 35, which are Z-shaped in section and which surround the openings 10 and 27 in the manner shown, for example, in Figs. 1, 3 and 5. These bars are fixed to the sheet material surrounding the openings 10 and 27 and include an inwardly extending and upwardly turned flange 36 which serves as a support for the covers 14 and 26. The other limb 37 of the bars 35, which are Z-shaped in cross-section is connected with the casing part 1 or 2 or other sheet material surrounding the openings in the manner shown in Figs. 3 and 5. The flange 36 with its upturned edge serves as a trough for trapping and leading away rain water which may enter around the covers, which in turn may include a supporting flange 40 resting in the flange 36. At the front the cover 14 extends down to the closing wall 13, which is a continuation of the bottom 4 as it curves upwardly at the front of the body, in the manner shown in Fig. 1.

Fig. 6 shows a constructional form which differs somewhat from that shown in Fig. 5 in that while the side walls 5 and 6 are the same, the casing part 2', particularly the wheel housing portions are differently shaped. In the construction shown in Fig. 5 the wheel housing elements 7' and 8' are oval in section, while in the construction shown in Fig. 6, the wheel housings include vertically directed side surfaces 38. Any other shapes may be used however.

The separate constructional elements of which the body is formed are joined or stuck together with a binding or cementing agent which preferably is the same as the material out of which the elements are formed. For example, where the body is formed of molded synthetic plastic units, the same synthetic plastic may be used for joining the elements together so that fused or substantially integral joints are obtained.

It is to be understood that the invention is not limited to the particular constructional example illustrated in the drawing and described above but may be applied to automotive vehicles with closed body structures, or closed superstructures.

What we claim is:

1. A self-supporting motor vehicle body of synthetic material, comprising an outer skin of synthetic sheet material including front and rear sections providing front and rear closing walls, said outer skin extending along the sides of the body and over the vehicle wheels to at least in part form the outer portions of wheel housings, spaced upright substantially vertical interior continuous longitudinal side walls of synthetic sheet material extending from the front to the rear closing walls, a bottom wall of synthetic sheet material attached to the lower edges of said interior side walls and extending the length of the vehicle body, said interior side walls respectively located in spaced relation inside the outer skin of the body along its sides and extending respectively along inside the wheels on the respective sides of the vehicle and up to the outer skin of the body, the upper edges of the interior side walls being attached to the sheet material of the outer skin of the body thereby forming inside walls for the body including the wheel housings, and a transversely extending upright sheet of synthetic material intermediate the ends of the body attached to the bottom wall, the interior side walls, and at the top to the outer skin of the body.

2. A motor vehicle body as claimed in claim 1, in which the interior side walls are bowed outwardly at the middle portion of the body intermediate the front and rear wheels substantially to the skin of the body thereby providing a seat space.

3. A vehicle body as claimed in claim 2, in which the portion of the interior side walls forming the inner walls of the wheel housings include means for supporting the wheel axles of the vehicle, the middle portion of the interior side walls constituting inside frame members for vehicle doors.

4. A vehicle body as claimed in claim 1, in which the bottom wall and the interior side walls provide a highly webbed structure extending the length of the body and having a U-shaped cross-section.

5. A vehicle body as claimed in claim 1, in which the bottom wall and the interior side walls are integral and provide a highly webbed U-shaped structure in cross-section extending the length of the body of the vehicle.

6. A vehicle body as claimed in claim 1, in which said transversely extending upright sheet of synthetic material constitutes a transverse stiffener extending over substantially the entire width of the vehicle body at its middle section and at least in part constitutes a seat framing means.

7. A vehicle body as claimed in claim 1, including a transverse stiffener of synthetic sheet material at the middle section of the body having end portions respectively attached to said interior side walls, said transverse stiffener including elements attached to the bottom wall of the body which together with the bottom wall constitute a hollow transverse girder, the upper portion of said girder being shaped to provide a seat bottom, and a transverse wall of sheet material attached to the rear portion of said seat bottom and extending upwardly between the interior side walls and shaped to provide a back rest seat frame, said transverse wall being attached to said interior side walls and at the top to the outer skin of the vehicle body.

8. A self-supporting motor vehicle body of synthetic sheet material, comprising an outer skin of synthetic sheet material including a middle seat section, front and rear compartments provided with movable covers and front and rear end closing walls, spaced upright interior longitudinal side walls of synthetic sheet material extending from the front to the rear closing wall, a bottom wall of synthetic sheet material attached to the lower edges of said interior side walls and extending the length of the vehicle body, and a seat frame of synthetic sheet material extending transversely through the middle section of the body and attached to the bottom and interior side walls and constituting a constructional support in the body, said front compartment being defined at least in part by a wall structure including a bottom wall constituting a single molded part having a trough-shaped cross-section, said single molded part extending from the forward closing wall of the body to the middle part of the body and including an upwardly extending portion attached to the sheet material forming the skin of the body, said upwardly extending portion constituting an instrument panel in front of the seat frame.

9. A self-supporting motor vehicle body of synthetic material, comprising an outer skin of synthetic sheet material including side, front and rear sections, front and rear closing walls of synthetic sheet material attached to the outer skin, said outer skin extending along the sides of the body and over the vehicle wheels to at least in part form the outer portions of wheel housings, spaced upright substantially vertical interior continuous longitudinal side walls of synthetic sheet material extending from the front to the rear closing walls, a bottom wall of synthetic sheet material attached to the lower edges of said interior side walls and extending the length of the vehicle body, said interior side walls respectively located in spaced relation inside the outer skin of the body along its sides and extending respectively along inside the wheels on the respective sides of the vehicle and up to the outer skin of the body, the upper edges of the interior side walls being attached to the sheet material of the outer skin of the body thereby forming inside walls for the body including the wheel housings, and a seat frame of synthetic sheet material extending transversely through the middle section of the body having edges respectively attached to the bottom wall, the interior side walls, and at the top to the outer skin of the body, said seat frame forming a transverse stiffener for the bottom and interior side walls and a support at the top for the outer skin of the body.

10. A motor vehicle body as claimed in claim 9, in which said seat frame includes a web section extending upwardly then rearwardly to form the bottom of the seat frame, said web section then extending upwardly to form the back of the seat frame.

11. A vehicle body as claimed in claim 10, including a transverse web of sheet material attached to and extending from the lower portion of the back of the seat frame down to and attached to the bottom wall of the body, the ends of said transverse web being attached respectively to said interior side walls.

12. A self-supporting motor vehicle body of synthetic material, comprising an outer skin of synthetic sheet material provided with openings for a middle seat section and front and rear compartments, movable covers respectively for the front and rear compartments, front and rear closing walls of synthetic sheet material attached to the outer skin, said outer skin extending along the sides of the body and over the vehicle wheels to at least in part form the outer portions of wheel housings, spaced upright substantially vertical interior continuous longitudinal side walls of synthetic sheet material extending from the front to the rear closing walls, a bottom wall of synthetic sheet material attached to the lower edges of said interior side walls and extending the length of the vehicle body, said interior side walls respectively located in spaced relation inside the outer skin of the body along its sides and extending respectively along inside the wheels on the respective sides of the vehicle and up to the outer skin of the body, the upper edges of the interior side walls being attached to the sheet material of the outer skin of the body thereby forming inside walls for the wheel housings, and a vertical wall of synthetic sheet material spaced somewhat inwardly from the rear closing wall and extending transversely of the body between said interior side walls, said vertical wall forming the rear wall of the rear compartment and being attached to the bottom wall, the interior side walls and at the top to the outer skin of the body of the vehicle and constituting with the rear closing wall a transverse stiffener for the body of the vehicle.

13. A motor vehicle body as claimed in claim 12, in which said front compartment comprises a luggage space, a bottom wall for said luggage space above the bottom wall of the body of the vehicle extending between and attached to said interior side walls, said interior side walls of the body having longitudinally-extending pressed-out sections above the bottom wall of the luggage space, and said bottom wall of the luggage space including upwardly extending side portions pressed-out and fitting in said pressed-out portions respectively of the interior side walls of the body.

References Cited in the file of this patent
UNITED STATES PATENTS

| Number | Name | Date |
|---|---|---|
| 1,707,065 | Moss et al. | Mar. 26, 1929 |
| 2,169,788 | Berndt et al. | Aug. 15, 1939 |
| 2,271,310 | Schafer | Jan. 27, 1942 |
| 2,612,964 | Hobbs | Oct. 7, 1952 |
| 2,637,592 | Karlby | May 5, 1953 |

FOREIGN PATENTS

| Number | Country | Date |
|---|---|---|
| 884,399 | France | Apr. 27, 1943 |
| 601,189 | Germany | Aug. 10, 1934 |
| 436,639 | Great Britain | Oct. 15, 1935 |
| 68,586 | Switzerland | Apr. 27, 1914 |

OTHER REFERENCES

"Low-Pressure Laminates," in "Automobile Engineer," of December 1953, pp. 541–549.

"The Challenge of Plastics," in "Automotive Industries," of September 15, 1953, pp. 42–49 and 88.